US010637996B2

(12) United States Patent
Kwok (10) Patent No.: US 10,637,996 B2
(45) Date of Patent: Apr. 28, 2020

(54) ON-DEMAND ROAMING

(71) Applicant: T-Mobile USA, Inc., Bellevue, WA (US)

(72) Inventor: Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/616,809

(22) Filed: Jun. 7, 2017

(65) Prior Publication Data

US 2018/0359368 A1    Dec. 13, 2018

(51) Int. Cl.
| | | |
|---|---|---|
| *H04M 15/00* | (2006.01) | |
| *H04W 8/18* | (2009.01) | |
| *H04W 4/24* | (2018.01) | |
| *H04W 48/02* | (2009.01) | |
| *H04W 84/12* | (2009.01) | |
| *H04W 84/04* | (2009.01) | |
| *H04W 8/06* | (2009.01) | |
| *H04W 8/12* | (2009.01) | |

(52) U.S. Cl.
CPC ... *H04M 15/8038* (2013.01); *H04M 15/8207* (2013.01); *H04M 15/8228* (2013.01); *H04W 4/24* (2013.01); *H04W 8/183* (2013.01); *H04W 48/02* (2013.01); *H04W 8/06* (2013.01); *H04W 8/12* (2013.01); *H04W 84/042* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 8,001,253 B2 | 8/2011 | Sullivan et al. | |
| 9,930,048 B2* | 3/2018 | Chhabra | H04L 63/107 |
| 2006/0077986 A1* | 4/2006 | Rune | H04L 63/08 370/401 |
| 2008/0262975 A1* | 10/2008 | Kozisek | G06Q 20/085 705/77 |
| 2009/0318140 A1* | 12/2009 | Gamel | H04W 36/30 455/432.1 |
| 2010/0316029 A1* | 12/2010 | Kappler | H04L 41/0813 370/338 |
| 2011/0130118 A1* | 6/2011 | Fan | H04M 15/00 455/411 |
| 2012/0210404 A1* | 8/2012 | Patil | H04L 41/0293 726/6 |
| 2013/0007853 A1 | 1/2013 | Gupta et al. | |
| 2014/0018037 A1 | 1/2014 | Shanmugavadivel et al. | |

(Continued)

OTHER PUBLICATIONS

PCT Search Report and Written Opinion dated Oct. 16, 2018 for PCT Application No. PCT/US2018/034931, 20 pages.

*Primary Examiner* — German Viana Di Prisco
(74) *Attorney, Agent, or Firm* — Lee & Hayes, P.C.

(57) ABSTRACT

A solution to provide on-demand roaming service to a user device. An available third-party wireless access point is detected. In a case the roaming user device is not authorized to access the detect third-party access point due to the existing subscription to home service provider and/or lack of roaming agreement between home service provider and the detected third-party access point, an on-demand roaming arrangement will be negotiated to enable the user device to access wireless resources associated with the third-party access point.

20 Claims, 7 Drawing Sheets

(56) References Cited

U.S. PATENT DOCUMENTS

| | | | |
|---|---|---|---|
| 2014/0094142 A1 | 4/2014 | Torres et al. | |
| 2014/0355523 A1* | 12/2014 | Congdon | H04W 48/12 |
| | | | 370/328 |
| 2015/0312808 A1* | 10/2015 | Kiss | H04W 4/24 |
| | | | 370/331 |
| 2015/0373579 A1* | 12/2015 | Xu | H04W 28/0289 |
| | | | 370/230 |
| 2016/0345215 A1* | 11/2016 | strom | H04L 67/2809 |
| 2017/0041778 A1* | 2/2017 | Dowlatkhah | H04W 8/20 |
| 2018/0041943 A1* | 2/2018 | Visuri | H04W 76/10 |
| 2018/0152881 A1* | 5/2018 | Tipton | H04W 48/08 |

* cited by examiner

ON-DEMAND ROAMING

BACKGROUND

Modern telecommunication systems include heterogeneous mixtures of second, third, and fourth generation (2G, 3G and 4G) cellular based wireless access technologies, which may be cross-compatible and may operate collectively to provide mobile data communication services. Further, wireless devices often may supplement cellular based data capacity with Wi-Fi connectivity capacity to access Wi-Fi based access points to wireless resources.

From infrastructure perspective, the environment for mobile connectivity includes a mix of air interface technologies provided by service providers including cellular, public wi-Fi, private Wi-Fi, etc. Some telecommunication service providers may provide both cellular based access service and Wi-Fi based access service, while others may focus on one of the two connectivity technologies.

Roaming may further complicate the connectivity environment. Inter-operator roaming may include roaming between the same connectivity technologies, e.g., between Wi-Fi services, or may include roaming across connectivity technologies, e.g., roaming from a cellular based service to a Wi-Fi based service of, e.g., a wireless internet service provider ("WISP"). Such roaming is conventionally achieved through pre-existing roaming agreements, e.g., bi-lateral agreements or partnership/alliance provisions, and implemented through authentication-authorization-accounting server ("AAA") servers of service providers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

1. Overview

Figure 1:
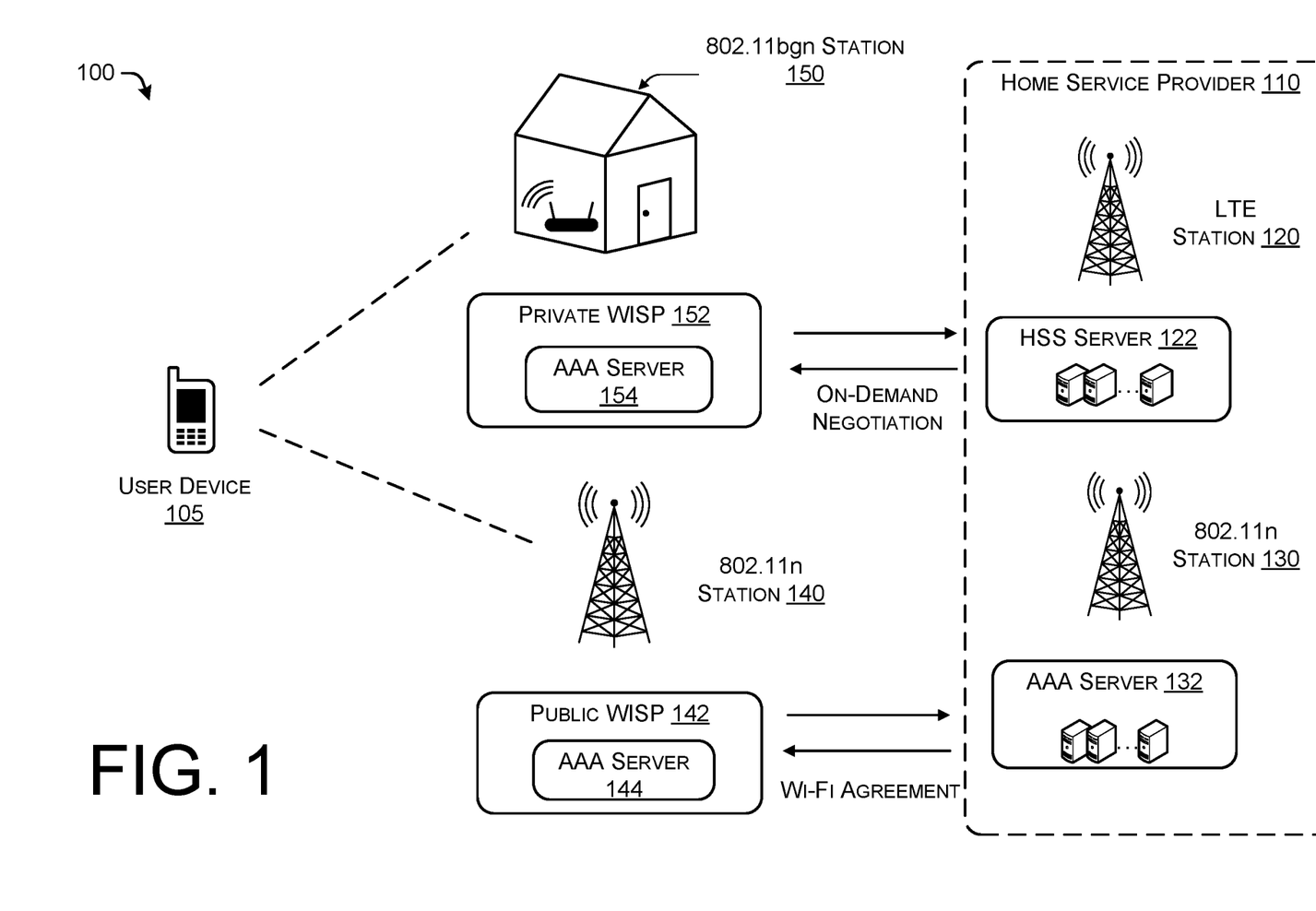
FIG. 1 illustrates an example environment.

The systems, devices, and techniques described herein are directed to providing on-demand roaming of a user mobile device ("UE"). FIG. 1 illustrate an example operation environment of on-demand roaming. Example user device 105 may include an existing subscription to a telecommunication service provider 110 ("home service provider") which provides both cellular connectivity services, operated through cellular access points, e.g., LTE base stations 120 (other cellular technologies are possible and included), and Wi-Fi based connectivity service, operated through a Wi-Fi access points 130, e.g., 802.11n stations (other frequency bands are possible and included). LTE station 120 is associated with an AAA server 122, where in LTE technology, is normally implemented through a Home Subscriber Server ("HSS server"). 802.11n station 130 is associated with an AAA server 132.

FIG. 1 shows, as an illustrative example, 802.11n server 132 and HSS server 122 as two separate physical servers, which is not necessary. 802.11n server 132 and HSS server 122 may reside on a same physical server device.

User device 105 may roam to an area that is covered by the subscription with home service provider 110. Being not covered by the subscription with home service provider 110 may include various scenarios, for example, that user device 105 is located within an area not covered by the radio frequency (RF) signals of the access points operated by home service provider 110, e.g., LTE station 120 and 802.11n station 130, or that user device 105 is located within an area not included in the existing subscription with home service provider 110. For example, user device 105 may be roaming to an area where user device 105 may access the voice cellular call service but not the cellular based data connectivity service.

Roaming user device 105 or home service provider 110 may detect that signals from example access points 802.11n station 140 and 802.11bgn station 150 are available for user device 105 to access a wireless network. The detection may be achieved through various solutions/techniques and all are included in the disclosure. For example, 802.11n station 140 and 802.11bgn station 150 may regularly broadcast beacon messages containing the service set identifier (SSID) and/or media access control (MAC) information thereof. User device 105 may use the received beacon message and the contained SSID and/or MAC to detect the available third-party access points.

802.11n station 140 may be operated by, e.g., a public WISP provider 142 having an AAA server 144. 802.11bgn station 150 may be operated by, e.g., a private WISP provider 152 having an AAA server 154. It should be appreciated that public WISP 142 and/or private WISP 152 are not necessarily separate/different legal entities than home service provider 110 and may be affiliates and/or related entities of home service provider 110. Public WISP 142 and private WISP 152 are different than home service provider 110 in that user device 105 includes no authorization to access the wireless resources of public WISP 142 and/or private WISP 152 under the existing subscription to home service provider 110.

Upon detecting the available access points 140, 150, user device 105 may send a request message to home service provider 110, e.g., through HSS server 122 and/or AAA server 132, for an on-demand roaming service with one or more of access points 140, 150 (and/or the associated service providers 142, 152, respectively) so that user device 105 may access the wireless resources thereof. The request message may include the identification of the detected access points, e.g., SSID and MAC information. In an example, the request message may be automatically sent out by user device 105 without user involvement. In another example, a user of use device 105 may be involved to select some out of multiple detected access points, e.g., access points 140, 150, as candidate third-party wireless resources to request on-demand roaming and send out the request message accordingly to home service provider 110.

Any approaches may be used to transmitting the on-demand roaming request message to home service provider 110 and all are included in the disclosure. In an example, an on-demand roaming request message may be sent by user device 105 and received by home service provider 110 via an available home network of home service provider 110 accessible by user device 105. For illustrative example, when home (or roaming) cellular network is available and user device 105 prefers on-demand roaming of Wi-Fi service, user device 105 may send the on-demand roaming request message through the available cellular network to home service provider 110. In another example, when home (or available roaming) Wi-Fi network is available and user device 105 prefers on-demand roaming of cellular service, e.g., to make voice calls, user device 105 may send the on-demand roaming request message through the available Wi-Fi network to home service provider 110

In another example, the roaming request may be send via the detected access point 140, 150 to home service provider 110. Industry standards may provide how an on-demand roaming request is sent via a third-party access point, e.g., 802.11n station 140 and/or 802.11bgn station 150, and/or the associated AAA servers, e.g., AAA servers 144, 154, respectively, to AAA/HSS servers 132, 122 of home service provider 110. For example, the current 3GPP Access Network Discovery and Selection Function (ANDSF) and the Wi-Fi alliance Hotspot 2.0 provisions/functions may be modified to provide the on-demand request message transmitting/relaying functions. In an example, the request message sent via third-party access point, e.g., 802.11n station 140, and/or the related service provider AAA server, e.g., AAA server 144, may include authentication information of user device 105. Such authentication information may be encrypted for information security purposes.

FIG. 1 shows, as illustrative examples, that third-party service providers 142 and 152 provide Wi-Fi based wireless resources, which does not limit the scope of the disclosure. User device 105 may detect multiple access points of Wi-Fi based connectivity, cellular based connectivity and/or other connectivity technologies and the disclosure may include/apply to all of them. Further, user device 105 may communicate with the detected access points using any communication technologies and all are included in the disclosure as well. For example, user device 105 may communicate with access points 140, 150 using Bluetooth technology and/or Near Field Communication (NFC) technology.

User device 105 may detect multiple available third-party access points and send the detected access pint identifications (automatically) to home service provider 110 as requests to access each of them. Home service provider 110 may use its roaming management mechanism to determine, e.g., through applying a policy, candidate third-party access points for further processing to enable on-demand roaming. In another example, user device 105 may include applications configured to apply rules/policies to locally screen the detected third-party access points before sending roaming request to home service provider 110.

Upon receiving the on-demand roaming request, either from user device 105 or via third-party AAA servers 144, 154, AAA server 122/132 of home service provider 110 may determine whether user device 105 is authorized to access the third-party wireless resource under the existing subscription and the existing relationship between home service provider 110 and the third-party wireless resource. For example, AAA server 122/132 may determine whether there is an existing bi-lateral/group roaming agreement between the third-party service provider, here e.g., WISP 142, 152, and home service provider 110. In a case that home service provider 110 includes an existing roaming agreement with and the third-party service providers 142, 152, AAA server 132/122 may further determine whether the existing subscription of user device 105 includes such roaming service. In a case that either of the two determinations yields negative result(s), AAA server 122/132 may determine that user device 105 is not authorized to access the third-party wireless resource under the existing subscription and the existing relationship between home service provider 110 and the third-party wireless resource.

AAA server 122/132 may then update at least one of the existing subscription or the existing relationship between home service provider 110 and a third-party service provider, e.g., 142, 152, to enable user device 105 to access the wireless resources of the third-party service provider. In an example, the updating may include AAA server(s) 122/132 negotiating with at least one of user device 105 or the third-party service provider, 142, 152, regarding the updating.

For example, AAA server 122/132 may first determine whether the third-party service provider 142, 152 is a member of an existing on-demand roaming alliance(s)/partnership that home service provider 110 joins. For illustrative example, AAA server 122/132 may determine whether third-party service provider(s) is a member of Wi-Fi Alliance Hotspot 2.0 standard. Such alliance/partnership may provide a framework (covering one or more of authentication, authorization and accounting) to negotiate an on-demanding roaming, even if there is no existing roaming agreement between home service provider 110 and the third-party service provider. In an example, AAA server 122/132 may assign higher priority to a third-party service provider associated to an on-demand roaming alliance/partnership in negotiating an on-demand roaming arrangement.

For a third-party service provider without any alliance/partnership together with home service provider 110, an ad hoc negotiation of on-demand roaming arrangement may be engaged. The ad hoc negotiation may include AAA server 122/132 requesting an on-demand roaming for user device 105 to access the wireless resources (or specified wireless resources) of the third-party service provider for a fixed period of time/fixed number of sessions in exchange for some accounting offers, e.g., monetary charge or resource sharing.

In the negotiation with user device 105, AAA server 122/132 may provide details of the on-demand roaming arrangement with a third-party service provider, e.g., details of the wireless resources and the charge to user device 105 for the on-demand roaming. AAA server 122/132 may provide on-demand roaming arrangements with multiple third-party service providers for user device 105 (user of user device 105) to choose from. The negotiation message between AAA server 122/132 and user device 105 may be sent through available home networks or may be sent through the relevant third-party service provider. For example, for an on-demand roaming arrange with private WISP 152, the negotiation message between AAA server 122/132 and user device 105 may be sent via private WISP 152, e.g., using 802.11bgn station 150. For an on-demand roaming arrange with public WISP 142, the negotiation message between AAA server 122/132 and user device 105 may be sent via public WISP 142, e.g., using 802.11n station 140.

After the on-demand roaming arrangement is agreed upon by both a third-party service provider, e.g., private WISP 152 or public WISP 142, and user device 105, one or more of AAA servers 122, 132 and the engaged third-party service provider may proceed configuring user device 105 to access the agreed upon wireless resources of the third-party service provider. Any configuration of user device 105 to access third-party wireless resources under the on-demand roaming may be possible and all are included in the disclosure. In an example, user device 105 may include a universal SKU element for system configuration and the third-party service provider may, e.g., through authorization from home service provider 110 as part of the roaming arrangement, access the universal SKU of user device 105 to configure user device 105. The configuration may also include installing plug-in application programs of the third-party service provider. Such system configuration may be removed upon termination of the on-demand roaming, which may be part of the configuration operation.

2. Example Devices

Figure 2:
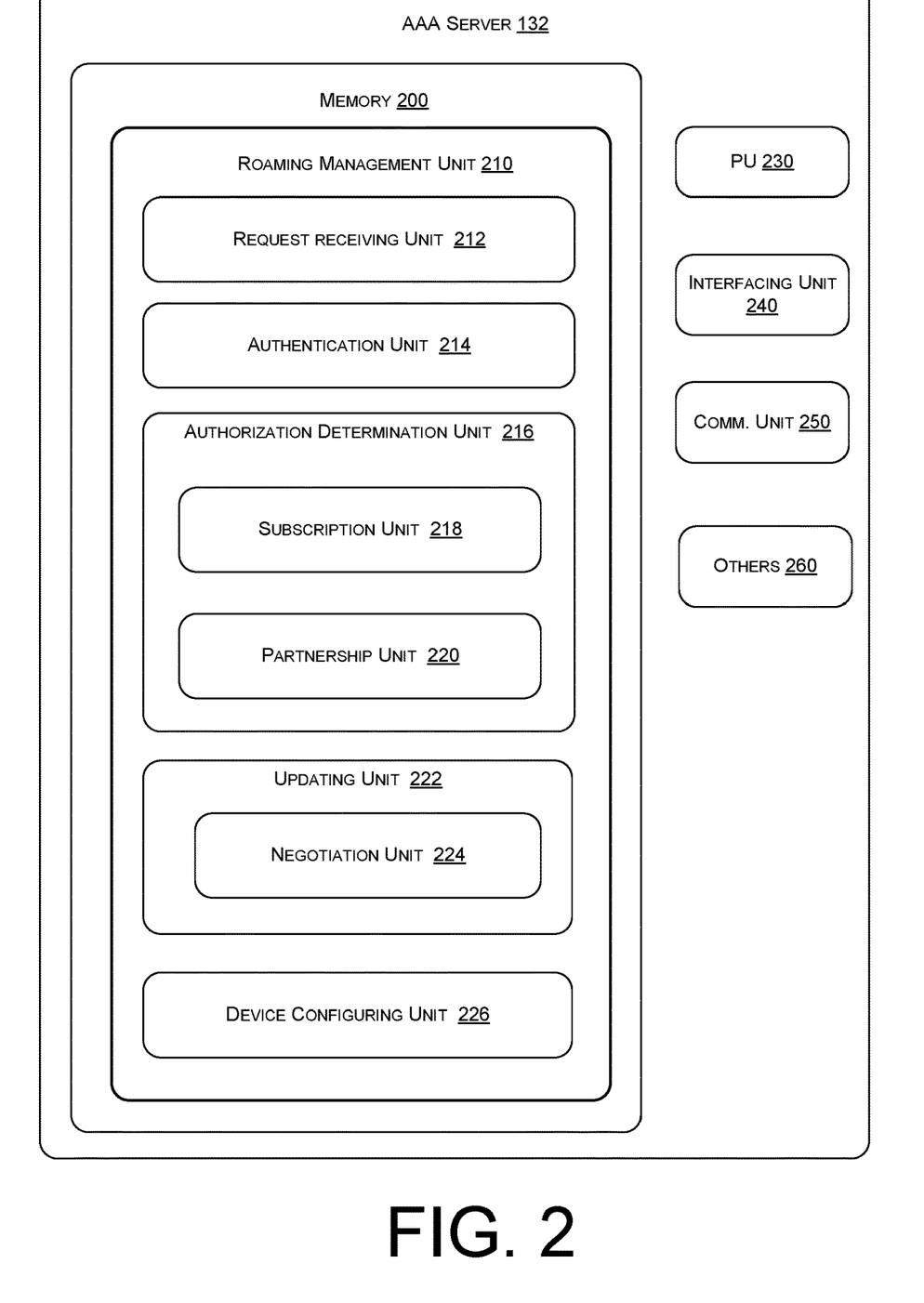
FIG. 2 illustrates an example AAA server.

FIG. 2 illustrates a system diagram showing aspects of an illustrative example AAA server 132. Although FIG. 1 shows AAA server 132 as associated to home service provider 110, it should be appreciated that AAA server 132 of service provider 110 may function as a roaming service provider in other scenarios. Similarly, each of AAA server 122, 144 and 154 shown in FIG. 1 may include similar structure and/or functions as AAA server 132.

As shown in FIG. 2, AAA server 132 may include a memory (memories) 200 containing computer executable instructions, which when executed by a processing unit, configures the processing unit to implement a roaming management unit 210. Roaming management unit 210 may include a request receiving unit 212, an authentication unit 214, and authorization determination unit 216, an updating unit 222, and a device configuring unit 226. Authorization determination unit 216 may further include a subscription unit 218 and a partnership unit 220. Updating unit 222 may further include a negotiating unit 224.

AAA server 132 may also include a processing unit(s) (PU) 230, an interfacing unit(s) 240, a communication unit(s) 250 and other components 260.

It should be appreciated that units of server 132 may reside on a single computing device, e.g., a server device, or in multiple computing devices in a distributed computing environment/system, and all are included in the disclosure. Details of a computing device or a distributed computing environment is not required to understand the disclosure and do not limit the scope of the disclosure.

Figure 3:
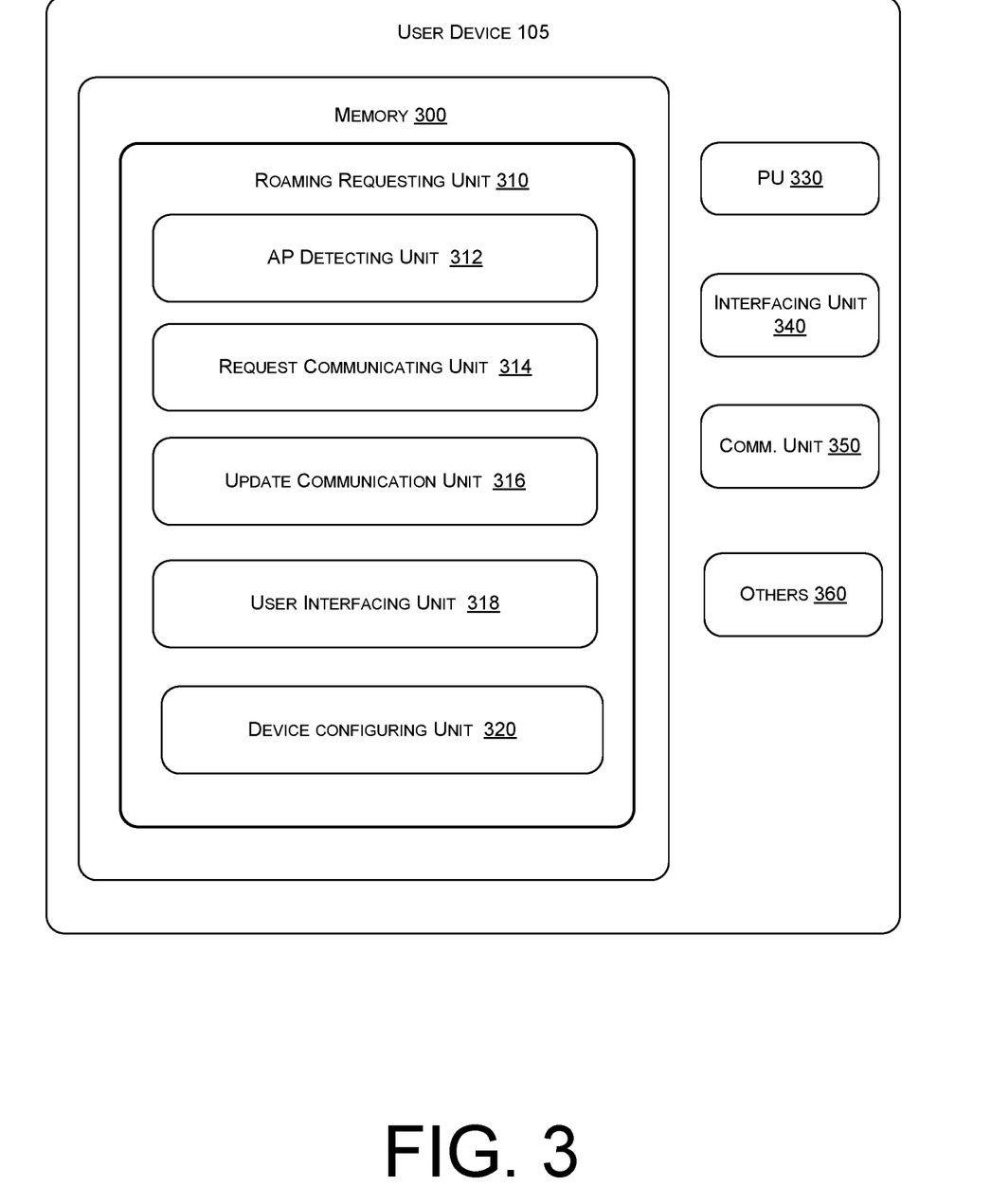
FIG. 3 illustrates an example user device.

FIG. 3 shows an example user device 105. User device 105 may include a memory (memories) 300 containing computer executable instructions, which when executed by a processing unit, configures the processing unit to implement a roaming request unit 310. Roaming request unit 310 may include an access point (AP) detecting unit 312, a request communication unit 314, an update communication unit 316, a user interfacing unit 318 and a device configuring unit 320.

User device 105 may also include a processing unit(s) (PU) 330, an interfacing unit(s) 340, a communication unit(s) 350 and other components 360.

Referring to FIGS. 2-3 together, in operation, AP detecting unit 312 may be configured to detect an identification of available third-party access points 140, 150 associated to third-party service providers 142, 152, respectively, which provide service of wireless resources. The identifications of the third-party access points may include SSID and MAC information thereof.

Request communication unit 314 may be configured to communicate a roaming request including the identification (SSID and/or MAC) of the available third-party wireless access point to a server, e.g., AAA server 132, of home telecommunication service provider 110 to which mobile device 105 is associated under an existing subscription. The communication of the third-party access point identification may be effectuated through an available network accessible by user device 105 or may be effectuated via the relevant third-party access point and/or the service provider operating the third-party access point. For example, user device 105 may communication identification of third-party access point 140 through AAA server 144 associated with access point 140. In an example, the communication of the detected access point identification may be automatically performed by request communication unit 314 without user intervention. For example, request communication unit 314 may be configured to automatically communicate all detected third-party access point identifications to home AAA server 132.

Request receiving unit 212 of AAA server 132 may be configured to receive the roaming request sent by request communication unit 314, requesting for user device 105 to access a third-party wireless resource.

Authentication unit 214 may be configured to check authentication information contained in the roaming request to ensure that the roaming request is originated from an authentic user device 105.

Authorization unit 216 may be generally configured to determine whether user device 105 includes authorization to access the third-party wireless resource under the existing subscription and an existing relationship between home service provider 110 and the third-party wireless resource, e.g., that of public WISP 142. Specifically, subscription unit 218 may be configured to check whether the existing subscription of user device 105 with home service provider 110 enables roaming user device 105 to access wireless resources of a third-party service provider, e.g., private WISP 152 or public WISP 142. In an example, such subscription check may be specific to each of the detected third-party service provider communicated to AAA server 132 of home service provider 110.

Partnership unit 220 may be configured to determine whether an existing relationship between a detected third-party service provider, e.g., private WISP 152 or public WISP 142, and home service provider 110. The existing relationship may be a roaming agreement or may be other relationships related to a roaming arrangement. For example, a third-party service provider, e.g., WISP 142, and home service provider 110 may be members of a same on-demand roaming alliance/partnership such that authentication-authorization-accounting rules/provisions are available for an on-demand roaming arrangement. The existing relationship may also include a scenario that there is no roaming related relationship between a third-party service provider, e.g., WISP 152, and home service provider 110.

Authorization determination unit 216 may also be configured to select/prioritize available third-party service providers for on-demand roaming. The selection/prioritizing may be based on the determined subscription and/or the determined existing relationship between third-party service providers and home service provider 110. For example, as illustrated in FIG. 1, home service provider 110 may include a Wi-Fi on-demand roaming partnership agreement with public WISP 142 through the respective AAA servers 132, 144. Consequently, authorization determination unit 216 may assign higher priority to public WISP 142 over private WISP 152 in arranging on-demand roaming for user device 105. The selection/prioritizing may also be based on industry standards, e.g., 3GPP Access Network Discovery and Selection Function (ANDSF) and the Wi-Fi alliance Hotspot 2.0.

Updating unit 222 may be configured to update at least one of the existing subscription or the existing relationship between home service provider 110 and the third-party service provider of wireless resource to enable user device 105 to access the third-party wireless resource. Specifically, negotiation unit 224 may be configured to negotiate with user device 105 and/or a third-party service provider regarding the updates. The negotiation with the third-party service provider may be conducted through the respective AAA servers based on existing authentication-authorization-accounting rules/provisions or based on ad hoc negotiations. The negotiation with user device 105 may include communicating the proposed updates to the subscription, e.g., an additional fee for the on-demand roaming, for a user of user device 105 to accept.

Update communication unit 316 may be configured to receive the proposed subscription update from AAA server 132 of home service provider 110 and to return a user feedback on the proposed subscription update back to AAA server 132. Similar to the communication of roaming requests, the communication of the subscription updates may be performed through available home networks (including networks of roaming partners of home service provider 110) and/or may be performed via the relevant third-party service provider, e.g., WISPs 142, 152. For example, in a case that a subscription update is related to a proposed on-demand roaming to access wireless resources of public WISP 142, the message of the proposed subscription update, e.g., additional fees and the details of the available wireless resources for the roaming, may be sent to and received by update communication unit 316 via AAA server 144 of public WISP 142.

User interfacing unit 318 may be configured to display the received proposed subscription update(s) and to detect user response to the proposed subscription updates. A positive feedback, e.g., acceptance of the proposed subscription update, may be detected and relayed to update communication unit 316 to return to AAA server 132 of home service provider 110.

In some examples, user involvement may not be required in the negotiation. For example, the existing subscription and/or system configuration of user device 105 may include provisions on potential updates in relation to on-demand roaming and the subscription update may be automatically negotiated based on the existing provisions and configurations.

Device configuration unit 226 of AAA server 132 and/or device configuration unit 320 may be configured to configure, e.g., update system configuration of, user device 105 to enable user device 105 to access wireless resources of third-party service provider. As mentioned herein, AAA server 132 may also function as the AAA server of a third-party service provider in a scenario that service provider 110 functions as a roaming service provider. Device configuring unit 226 may also be configured to configure a visiting user device 105 to access proprietary wireless resources of service provider 110.

3. Example Processes

FIGS. 4-7 illustrate example operation processes. The operation processes are illustrated as example flow graphs, each operation of which may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 4:
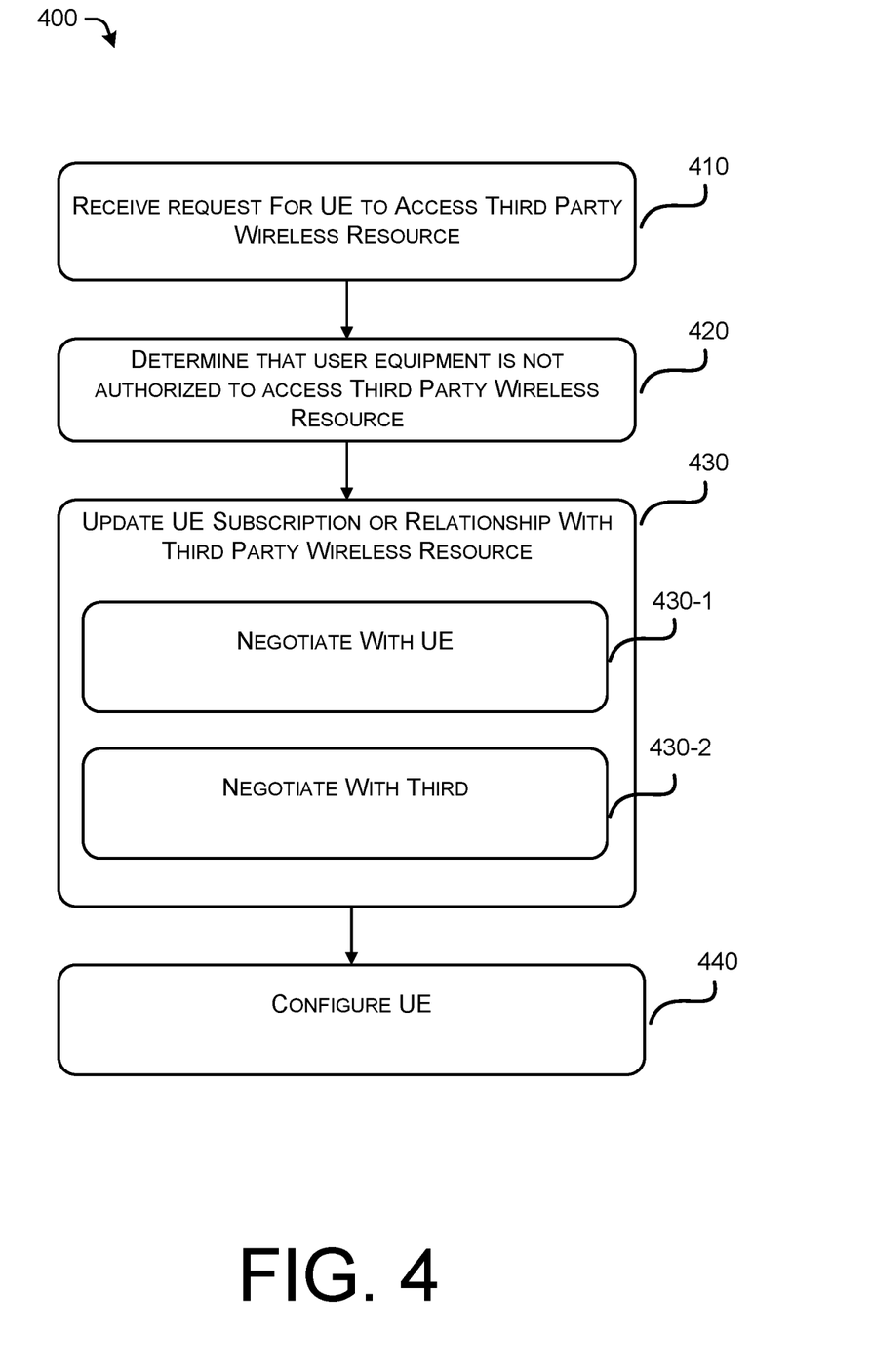
FIG. 4 illustrates an example operation process.

FIG. 4 illustrates an example operation process 400 for handling on-demand roaming through AAA server 132 of home service provider 110.

In example operation 410, request receiving unit 212 may receive a roaming request(s) from a user device 105 for user device 105 to access a third-party wireless resource.

In example operation 420, authorization unit 216 may determine that user device 105 is not authorized to access the third-party wireless resource under the existing subscription and/or an existing relationship between home service provider 110 and the third-party wireless resource, e.g., that of public WISP 142. Other roaming arrangement may be engaged if authorization unit 216 determines that user device 105 is authorized to access the third-party wireless resource without on-demand roaming.

In example operation 430, updating unit 222 may update at least one of the existing subscription of user device 105 or the existing relationship between home service provider 110 and the third-party service provider of wireless resource to enable user device 105 to access the third-party wireless resource. Specifically, example operation 430 may include sub-operation 430-1, where negotiation unit 224 may negotiate with user device 105 regarding an update of the existing subscription regarding an on-demand roaming. In sub-operation 430-2, negotiation unit 224 may negotiate with the third-party service provider to arrange an on-demand roaming. The negotiation with third-party service provider may follow existing standards or alliance/partnership provisions or may be an ad hoc negotiation.

In example operation 440, device configuration unit 226 of AAA may, together with user device 105 and/or the third-party service provider, configure user device 105 to access wireless resources of the third-party service provider.

Figure 5:
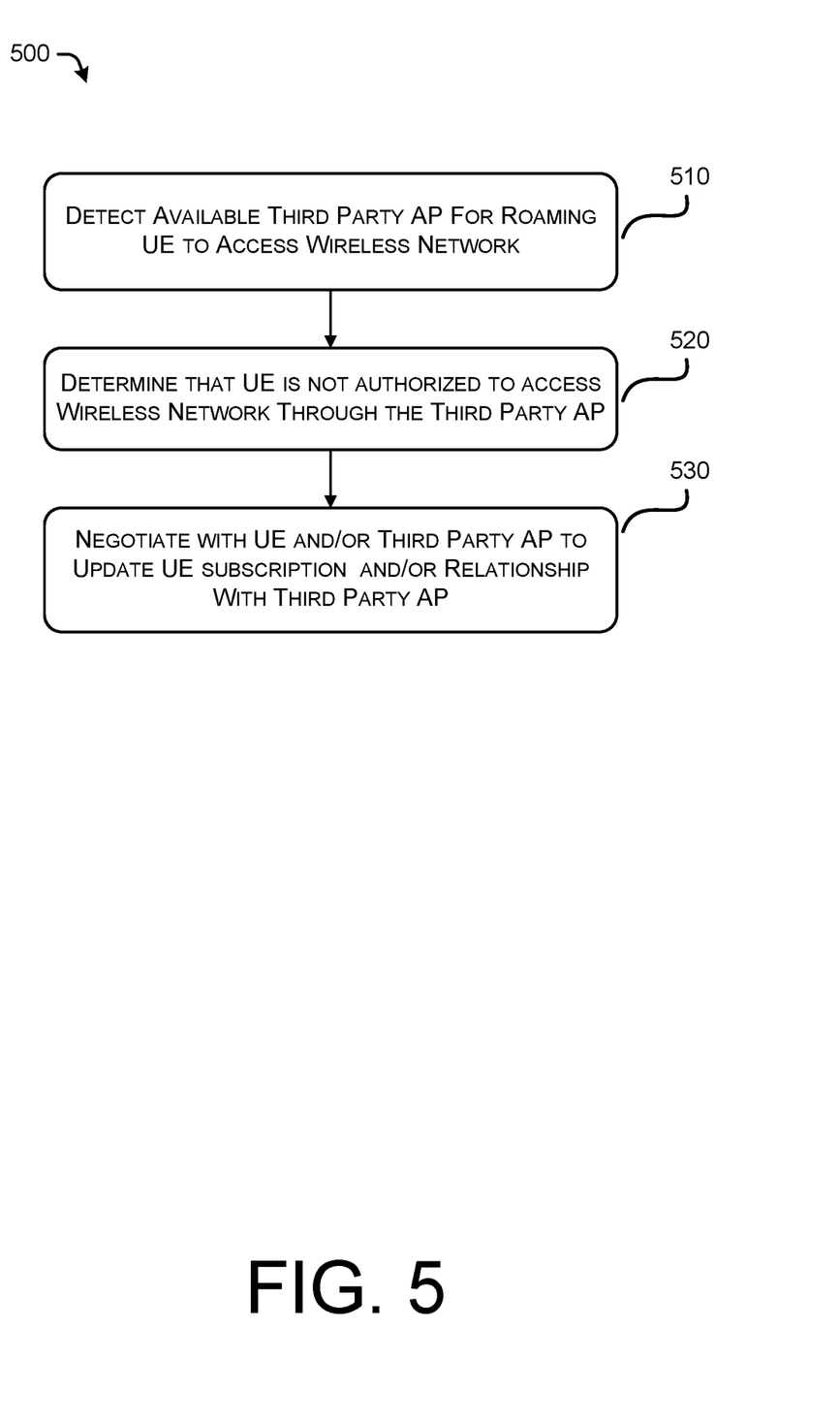
FIG. 5 illustrates another example operation process.

FIG. 5 illustrates another example operation process of handling on-demand roaming on AAA server 132.

In example operation 510, request receiving unit 212 may detect available third-party access points for roaming user device 105 to access wireless network. A third-party access point refers to a wireless access point, e.g., 802.11n station 140 operated by a third-party service provider, e.g., public WISP 142. There are various approaches to detect available third-party access points and all are included in the disclosure. For example, a location of roaming user device 105 may be determined and matched with a provided access point map(s) to determine an available third-party access point.

In example operation 520, authorization unit 216 may determine that user device 105 is not authorized to access the wireless network through the detected third-party access point based on the existing subscription and/or an existing relationship between home service provider 110 and the third-party service provider, e.g., public WISP 142, which operates the detected third-party access point, e.g., 802.11n station 140.

In example operation 530, negotiation unit 224 of updating unit 222 may negotiate with user device 105 and/or a detected third-party access point (or the service provider thereof) to update at least one of the existing subscription of user device 105 or the existing relationship between home service provider 110 and the third-party service provider of wireless resource to enable user device 105 to access the third-party wireless resource.

Figure 6:
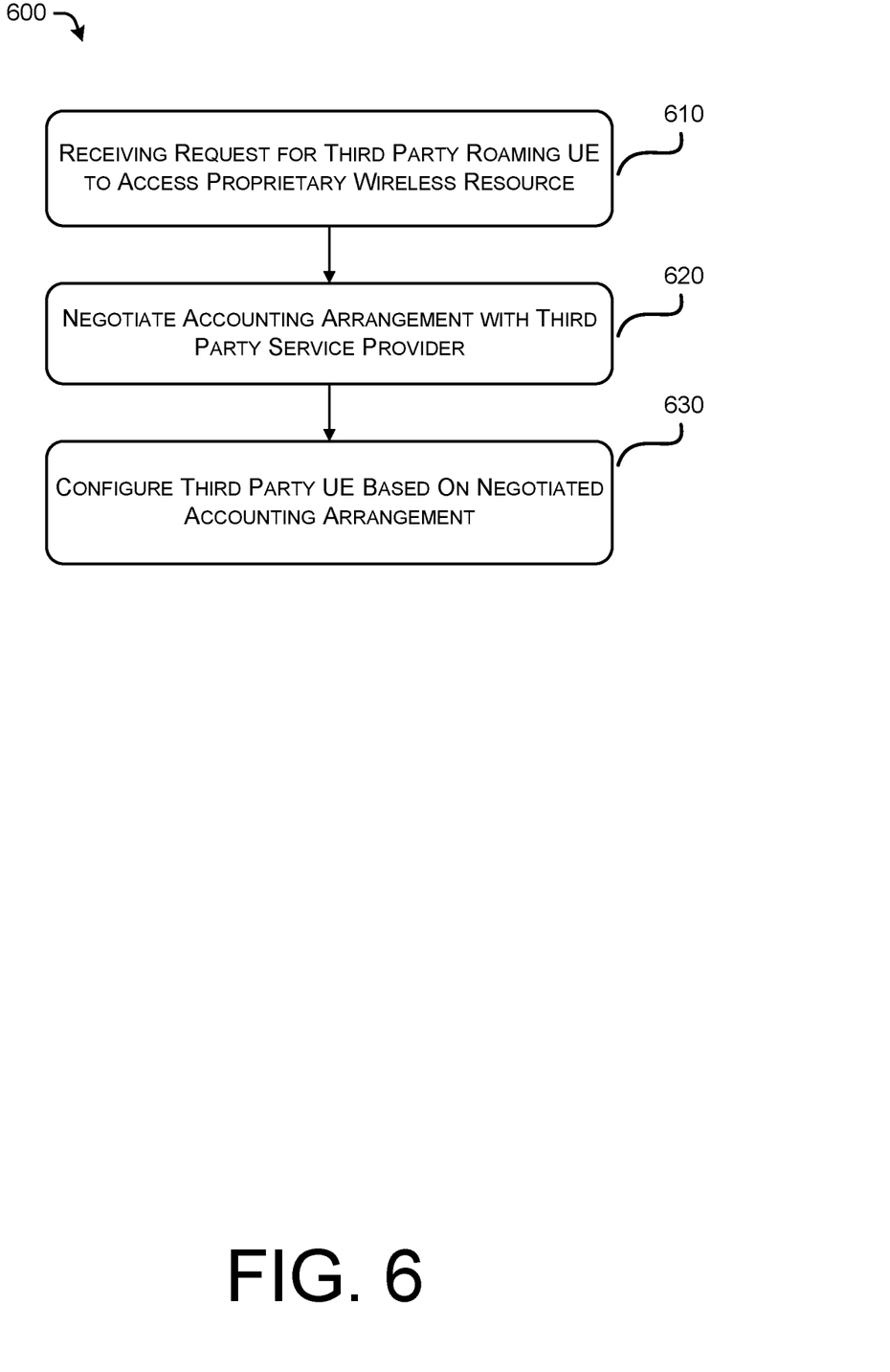
FIG. 6 illustrates another operation process.

FIG. 6 illustrates an example operation process 600 of AAA server 132 handling on-demand roaming for service provider 110 acting as a roaming service provider. Basically, in the example operation 600 of FIG. 6, AAA server 132 may function similarly as in a position of either AAA server 144 or AAA server 154 of FIG. 1. In the description herein, for simplicity, the position of AAA server 144 in the example environment of FIG. 1 may be used to describe the operations of AAA server 132 as a roaming AAA server.

In example operation 610, request receiving unit 212 may receive a request for a third-party roaming user device 105 to access proprietary wireless resource of service provider 142. A third-party user device 105 refers to a user device 105 having no existing subscription of services provided by service provider 142. The request may be received directly from third-party user device 105 and may be received from the home service provider 110 ("third-party service provider") of third-party user device 105, e.g., from AAA server 122.

In example operation 620, negotiation unit 224 may negotiate an accounting arrangement with home service provider 110 of roaming user device 105 ("third-party service provider 110"). The accounting arrangement may be based on existing on-demand roaming provisions of a standard and/or an industry alliance/partnership or may be based on ad hoc negotiation.

In example operation 630, device configuring unit 226 may configure third-party roaming user device 105 based on the negotiated accounting arrangement. For example, the accounting arrangement may provide which proprietary wireless resources are accessible by roaming user device 105 and the configuration of user device 105 may be performed accordingly.

Figure 7:
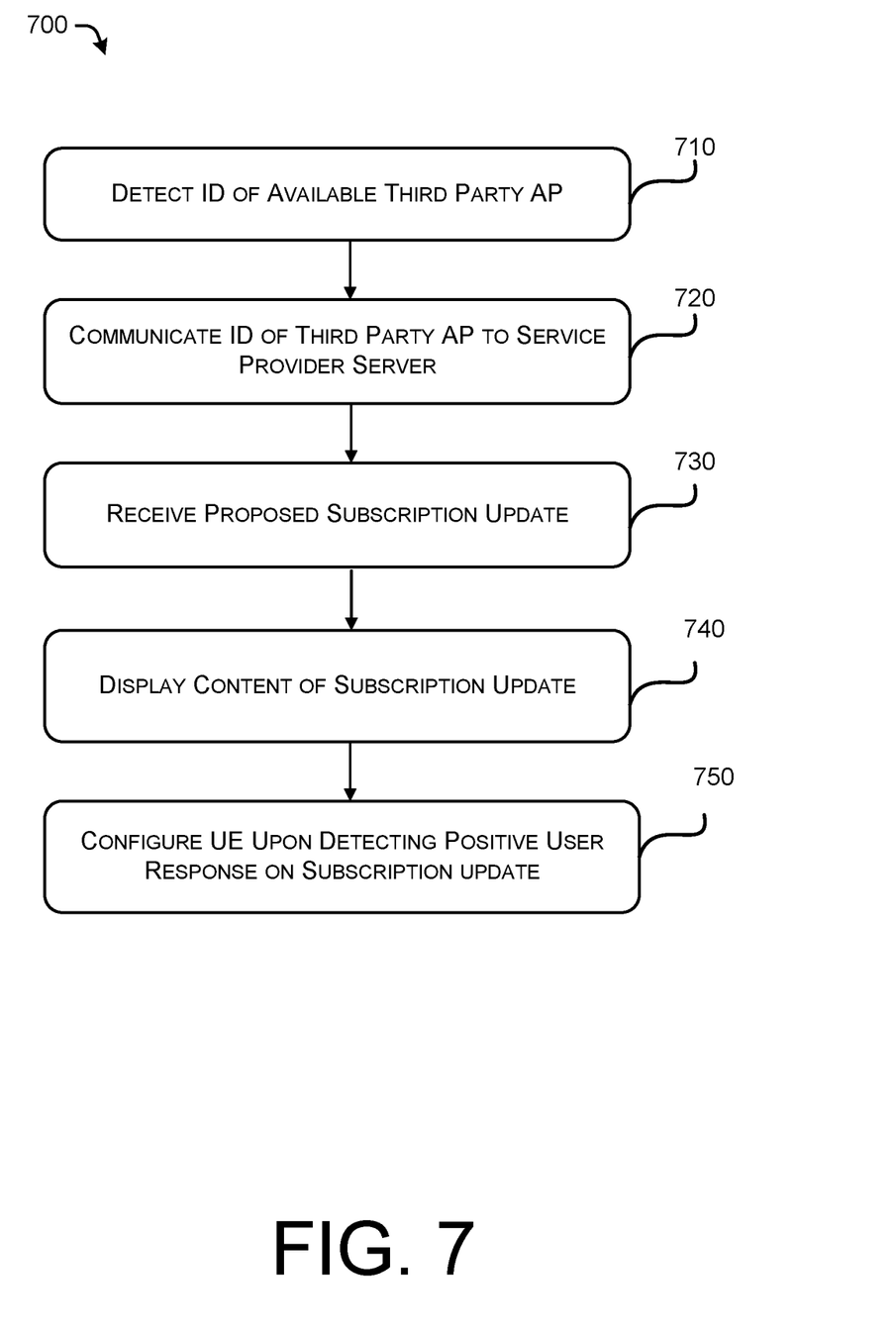
FIG. 7 illustrates another operation process.

FIG. 7 illustrative an example operation process 700 for handling on-demand roaming by user device 105. In example operation 710, AP detecting unit 312 may detect an identification of an available third-party access points, e.g., 140, 150, associated to third-party service providers, e.g., 142, 152, respectively, which provide service of wireless resources. The identification of the third-party access point may include SSID and MAC information of the access point.

In example operation 720, request communication unit 314 may communicate a roaming request including the identification (SSID and/or MAC) of the available third-party wireless access point to a server, e.g., AAA server 132, of home telecommunication service provider 110 to which mobile device 105 is associated under an existing subscription. The communication of the third-party access point identification may be effectuated through an available network accessible by user device 105 or may be conducted via the relevant third-party access point and/or the service provider operating the third-party access point. The communication of the identification of third-party access point may server the purpose of requesting on-demand roaming with the third-party access point, e.g., to access the related wireless resources.

In example operation 730, update communication unit 316 may receive the proposed subscription update from AAA server 132 of home service provider 110.

In example operation 740, user interfacing unit 318 may display the received proposed subscription update(s) in a manner for a user to input user feedback on the proposed subscription updates. The displaying may be performed in various approaches, including but not limited to, text, sounds and/or multimedia, and all are included in the disclosure.

In example operation 750, upon user interfacing unit 318 detecting a positive feedback of a user on the proposed subscription update, configuration unit 320 may configure user device 105 to enable user device 105 to access wireless resources of third-party service provider. In an example, configuration unit 320 may function together with device configuration unit 226 of AAA server 132 in configuring user device 105.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer implemented method comprising:
    receiving, by an authentication-authorization-accounting (AAA) server of a service provider and from a user device with an existing subscription to the service provider, an identification of candidate third-party wireless resources provided through Wi-Fi based network access points and a request for the user device to access any of the candidate third-party wireless resources, wherein the request is received from the user device through a cellular network of the service provider;
    determining that the user device includes no authorization to access the candidate third-party wireless resources under the existing subscription;
    negotiating, by the AAA server, on-demand roaming arrangements with the candidate third-party wireless resources, comprising assigning a higher priority for the on-demand roaming arrangements to ones of the candidate third-party wireless resources associated with an on-demand roaming partnership;
    creating a new roaming agreement between the service provider and a third-party wireless resource among the candidate third-party wireless resources, wherein the new roaming agreement establishes an agreement for access to the third-party wireless resource for a fixed period of time or a fixed number of sessions;
    updating at least one of the existing subscription or the new roaming agreement between the service provider and the third-party wireless resource to enable the user device to access the third-party wireless resource; and
    configuring the user device to enable access to the third-party wireless resource by the user device based on at least one of the existing subscription or the new roaming agreement.

2. The computer implemented method of claim 1, wherein the creating the new roaming agreement between the service provider and the third-party wireless resource includes the third-party wireless resource providing a one-time authorization for the user device to access the third-party wireless resource.

3. The computer implemented method of claim 1, wherein the updating the creating the new roaming agreement between the service provider and the third-party wireless resource includes updating an existing roaming arrangement between the third-party wireless resource and the service provider in exchange for an accounting offer.

4. The computer implemented method of claim 1, wherein the request from the third-party wireless resource comprises an AAA message.

5. The computer implemented method of claim 4, wherein the request received from the third-party wireless resource includes authentication information of the existing subscription.

6. The computer implemented method of claim 5, wherein the authentication information of the existing subscription is encrypted.

7. The computer implemented method of claim 1, wherein the third-party wireless resource includes a private wireless network access point.

8. The computer implemented method of claim 1, wherein the new roaming agreement between the third-party wireless resource and the service provider includes the on-demand roaming partnership.

9. The computer implemented method of claim 1, wherein the third-party wireless resource implements Wi-Fi Alliance (WFA) Hotspot 2.0 as the on-demand roaming partnership.

10. The computer implemented method of claim 1, wherein the service provider provides both a cellular based network access service and a Wi-Fi based wireless network access service.

11. The computer implemented method of claim 1, further comprising configuring the user device to access the third-party wireless resource without user involvement.

12. The computer implemented method of claim 1, wherein the user device detects the third-party wireless resource based on a beacon message broadcasted by the third-party wireless resource.

13. The computer implemented method of claim 12, wherein the beacon message includes SSID and MAC information associated with the third-party wireless resource.

14. The computer implemented method of claim 1, further comprising:
communicating the on-demand roaming arrangements to the user device; and
receiving a selection of the third-party wireless resource from the user device.

15. The computer implemented method of claim 1, wherein the user device sends the identification of candidate third-party wireless resources and the request to access any of the candidate third-party wireless resources without user involvement.

16. A server of a telecommunication service provider, comprising:
a processing unit; and
a storage device containing computer executable instructions which, when executed by the processing unit, configure the processing unit to implement a roaming management unit operable to:
receive a message from a user device with an existing subscription to the telecommunication service provider to access any of third-party wireless access points identified in the message, wherein the message is received through a cellular network of the telecommunication service provider;
determine that the user device includes no authorization to access the third-party wireless access points under the existing subscription;
negotiate on-demand roaming arrangements with the third-party wireless access points, assigning higher priority for the on-demand roaming arrangements to one or more third-party wireless access points associated with an on-demand roaming alliance;
receive an indication of a selection from the user device of an available third-party wireless access point from among the third-party wireless access points based, at least in part, on the on-demand roaming arrangements;
create a new roaming agreement between the telecommunication service provider and the available third-party wireless access point, wherein the new roaming agreement establishes an agreement for access to the available third-party wireless access point for a fixed period of time or a fixed number of sessions;
update the existing subscription or the new roaming agreement between the telecommunication service provider and the available third-party wireless access point, respectively, to authorize the user device to access a wireless network through the available third-party wireless access point; and
configure the user device to enable access to the third-party wireless access point by the user device based on at least one of the existing subscription or the new roaming agreement, comprising installing a plug-in application program of the available third-party wireless access point on the user device.

17. The server of claim 16, wherein the roaming management unit is further operable to:
receive a request for a third-party roaming user device subscribed to a third-party service provider to access a proprietary wireless resource of the telecommunication service provider;
negotiate an accounting arrangement with the third-party service provider for the access based on the request; and
configure the third-party roaming user device to access the proprietary wireless resource based on the accounting arrangement.

18. The server of claim 16, wherein the available third-party wireless access point is based on a resource sharing accounting scheme.

19. The server of claim 16, wherein the on-demand roaming alliance comprises an Wi-Fi Alliance Hotspot 2.0.

20. A mobile device, comprising:
a processing unit; and
a memory containing executable instructions which, when executed by the processing unit, configures the processing unit to implement a roaming requesting unit operable to:
detect an identification of an available third-party wireless access point, wherein the identification comprises information indicative of whether the available third-party wireless access point is a public wireless access point or a private wireless access point and indicative of the mobile device not having authorization to access the available third-party access point;
communicate the identification of the available third-party wireless access point and other available third-party wireless access points to a server of a telecommunication service provider to which the mobile device is associated under an existing subscription;
receive from the server a proposed update of the existing subscription with access to the available third-party access point and proposed on-demand roaming arrangements with access to the other available third-party wireless access points respectively;
display, as displayed content, through a user interface of the mobile device a content of the proposed update and the proposed on-demand roaming arrangements configured for a user of the mobile device to respond, wherein a higher priority is assigned to one or more of the proposed update and the proposed on-demand roaming arrangements associated with an on-demand roaming partnership; and upon detecting a positive response to the displayed content, configure the mobile device to access the available third-party wireless access point, wherein the configuring comprises installing a plug-in application program of the third-party wireless access point.

* * * * *